United States Patent
Anderson et al.

(10) Patent No.: US 12,442,679 B2
(45) Date of Patent: *Oct. 14, 2025

(54) SYSTEM AND METHOD FOR MEASURING WEIGHTS OF VEHICLES AND TRAILERS

(71) Applicant: Progress Mfg. LLC, Provo, UT (US)

(72) Inventors: Jed K. Anderson, Lindon, UT (US); David F. Lundgreen, Spanish Fork, UT (US); Jason R. Harper, Spanish Fork, UT (US)

(73) Assignee: Progress Mfg. LLC, Provo, UT (US)

( * ) Notice: Subject to any disclaimer, the term of this patent is extended or adjusted under 35 U.S.C. 154(b) by 328 days.

This patent is subject to a terminal disclaimer.

(21) Appl. No.: 17/867,603

(22) Filed: Jul. 18, 2022

(65) Prior Publication Data

US 2024/0019292 A1    Jan. 18, 2024

(51) Int. Cl.
*G01G 19/02*    (2006.01)
*B66F 3/25*    (2006.01)
*G01G 19/52*    (2006.01)

(52) U.S. Cl.
CPC .............. *G01G 19/02* (2013.01); *B66F 3/25* (2013.01); *G01G 19/52* (2013.01)

(58) Field of Classification Search
CPC ...... B66F 3/25; B66F 3/26; B66F 3/38; B66F 3/42; B66F 3/28; G01G 19/10; G01G 19/02; G01G 19/52; G01G 19/07; G01G 19/08; G01G 19/083
USPC ..................... 254/96 R, 96 H, 89 H
See application file for complete search history.

(56) References Cited

U.S. PATENT DOCUMENTS

| 245,201 A | 8/1881 | Mills |
| 522,993 A | 7/1894 | Lobee |
| 1,354,447 A | 9/1920 | Troll |
| 1,828,022 A * | 10/1931 | Brand .................... G01G 19/02 |
| | | 177/208 |
| 2,373,469 A | 4/1945 | Grime |
| 2,380,362 A | 7/1945 | Hem |
| 2,477,854 A | 8/1949 | Baker |
| 2,500,686 A | 3/1950 | Jontz |

(Continued)

FOREIGN PATENT DOCUMENTS

| CN | 2333697 | 8/1999 |
| CN | 201010493 | 1/2008 |

(Continued)

OTHER PUBLICATIONS https://www.enerpac.com/en-us/simplex-basic-hydraulics pp. 2-4 (Year: 2022).*

(Continued)

*Primary Examiner* — C. A. Rivera
(74) *Attorney, Agent, or Firm* — McGarry Bair PC

(57) ABSTRACT

A hydraulic jack having a piston, configured to lift at least a portion of a vehicle or trailer, and a housing, where the housing includes a high pressure fluid chamber configured to receive at least a portion of the piston, and where increasing fluid pressure within the high pressure chamber moves the piston further out of the housing. The hydraulic jack also includes a weight gauge attached to the housing and in fluid communication with the high pressure fluid chamber, wherein the weight gauge is configured and calibrated to measure and display the weight of the vehicle or trailer being lifted by the piston.

32 Claims, 20 Drawing Sheets

(56) References Cited

U.S. PATENT DOCUMENTS

| | | |
|---|---|---|
| 2,909,367 A | 10/1959 | Goehrig, Jr. |
| 2,970,820 A | 2/1961 | Sepich |
| 3,200,897 A | 8/1965 | Gibbons |
| 3,433,314 A | 3/1969 | Peterson |
| 3,603,417 A | 9/1971 | Wachholz |
| 3,695,213 A | 10/1972 | Littlefield |
| 3,700,053 A | 10/1972 | Glissendorf |
| 3,797,594 A | 3/1974 | Chaffee |
| 3,890,684 A | 6/1975 | Tallman |
| 4,056,155 A | 11/1977 | Wahl |
| D363,242 S | 10/1995 | Scanlon |
| 6,494,478 B1 | 12/2002 | Mackarvich |
| 6,722,684 B1 | 4/2004 | McAllister |
| 6,868,364 B2 | 3/2005 | Allerding |
| 7,960,659 B2 | 6/2011 | Cleary |
| D663,637 S | 7/2012 | Stout |
| 9,004,523 B2 | 4/2015 | Scharf |
| 9,631,969 B1 | 4/2017 | Whalen |
| 10,596,869 B2 | 3/2020 | McAllister |
| 2006/0032679 A1* | 2/2006 | Wilson .................. G01G 19/02 |
| | | 177/136 |
| 2006/0290102 A1 | 12/2006 | VanBuskirk |
| 2007/0181864 A1 | 8/2007 | Bartee |
| 2009/0127532 A1 | 5/2009 | Yueh |
| 2009/0236578 A1 | 9/2009 | Nirenberg |
| 2010/0276212 A1* | 11/2010 | Hornstein ................ B66F 7/28 |
| | | 177/146 |
| 2013/0253814 A1 | 9/2013 | Wirthlin |
| 2016/0185170 A1* | 6/2016 | McAllister ............ B60D 1/248 |
| | | 177/136 |
| 2018/0072278 A1 | 3/2018 | Righetti |
| 2018/0072543 A1 | 3/2018 | Rucker et al. |
| 2019/0056261 A1 | 2/2019 | Regehr |
| 2019/0270488 A1 | 9/2019 | Behrens et al. |
| 2019/0292029 A1* | 9/2019 | Moore ..................... B66F 3/42 |
| 2020/0384817 A1 | 12/2020 | Anderson |
| 2024/0019293 A1* | 1/2024 | Anderson ................ B66F 3/42 |

FOREIGN PATENT DOCUMENTS

| | | |
|---|---|---|
| CN | 212954089 | 4/2021 |
| DE | 102004034105 A1 | 2/2006 |
| DE | 202011051374 U1 | 9/2011 |
| DE | 102017202008 A1 | 8/2018 |
| EP | 2363307 A2 | 9/2011 |
| WO | 2020073084 A1 | 4/2020 |

OTHER PUBLICATIONS

International Search Report dated Nov. 3, 2023 from corresponding international application PCT/US23/70407.

* cited by examiner

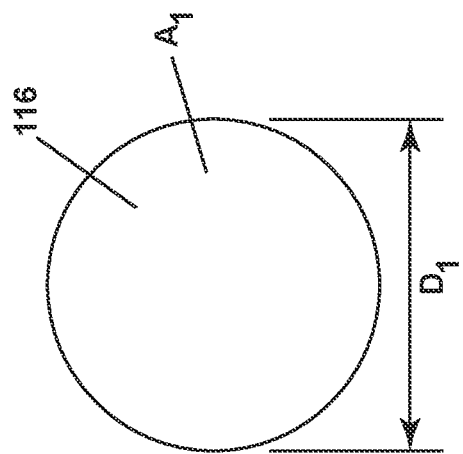
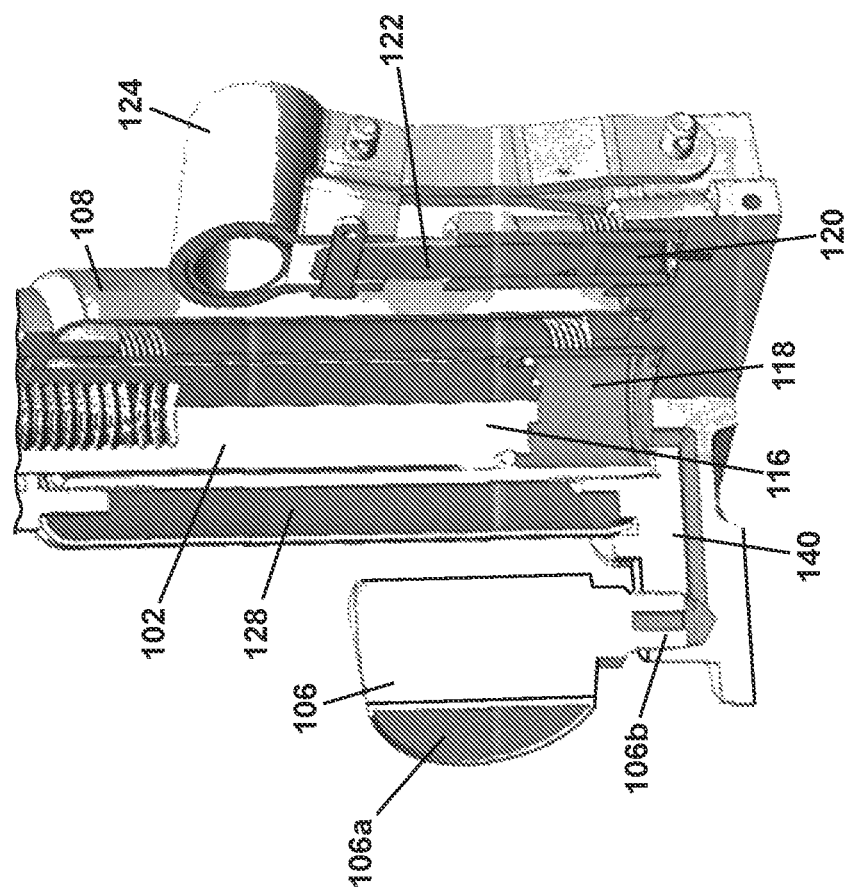
FIG. 6A
FIG. 6B

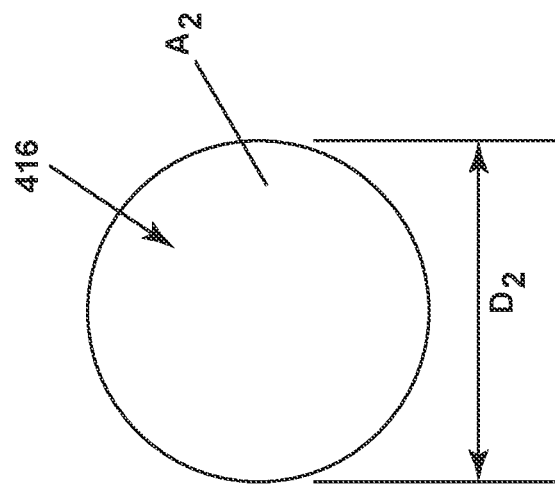
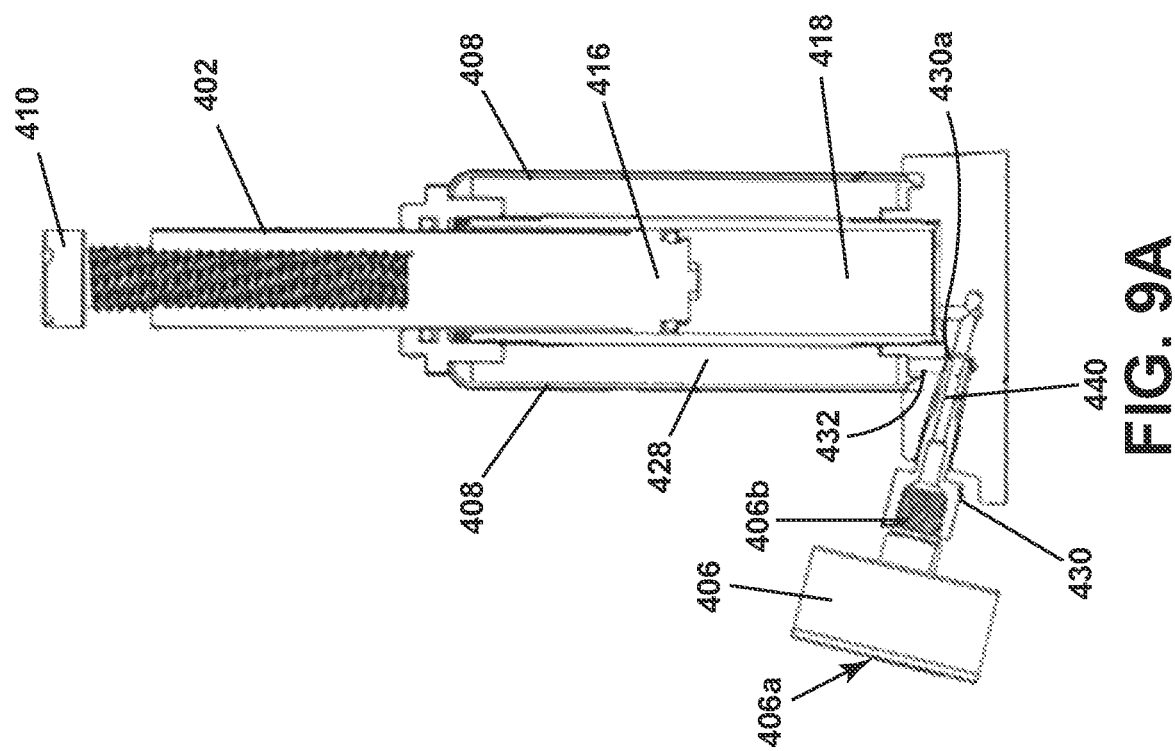

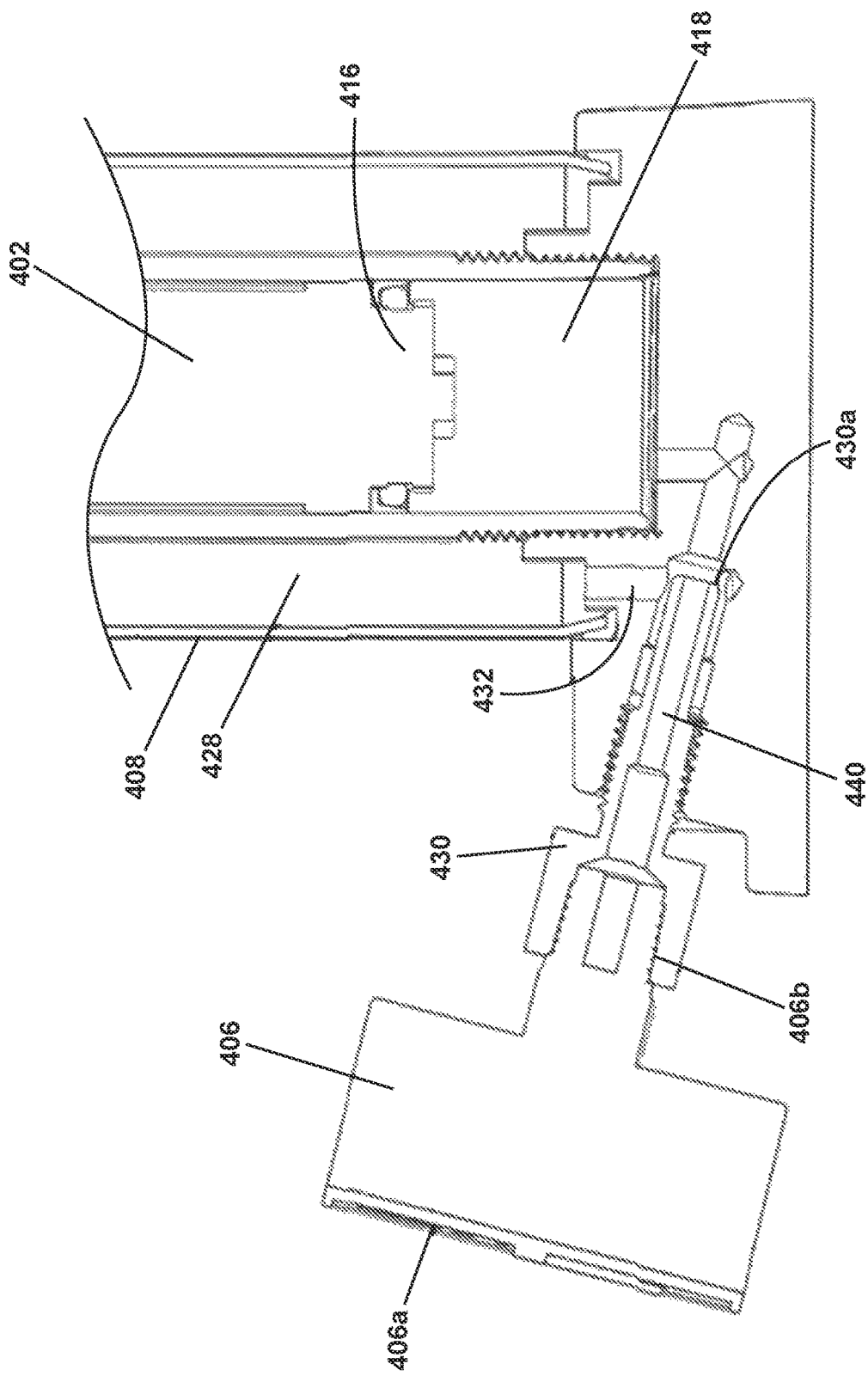

SYSTEM AND METHOD FOR MEASURING WEIGHTS OF VEHICLES AND TRAILERS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Present Disclosure

The present disclosure relates generally to hydraulic lift or jack devices, and more particularly, but not necessarily entirely, to hydraulic lifts and jack devices used to weigh vehicles or trailers, or portions thereof.

2. Description of Related Art

It is common practice to use a lift or jack to lift or raise various objects off the ground. Conventionally, hydraulic jacks, such as bottle jacks, are often used to lift vehicles or a trailer, or at least portions thereof, off the ground in order to make repairs, for storage, setup or other desired reasons. Many hydraulic jacks also include a pressure gauge that measures the fluid pressure within a working fluid chamber of the hydraulic jack. This pressure measurement can help a user ensure that the hydraulic jack is functioning properly and safely.

Measuring the weight of a trailer of vehicle is often only possible with the use of a hydraulic scale or other industrial weight measurement device. However, such scales are often very large, expensive and not practical for individual use. These industrial hydraulic scales typically utilize a fixed volume fluid chamber to measure the weight of an object and because the scale requires a fixed volume fluid chamber, such a scale cannot be used to actuate a piston or other mechanism to lift a vehicle of trailer while also measuring the weight of said vehicle or trailer.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims. Any discussion of documents, acts, materials, devices, articles or the like which has been included in the present specification is not to be taken as an admission that any or all of these matters form part of the prior art base, or were common general knowledge in the field relevant to the present disclosure as it existed before the priority date of each claim of this application.

BRIEF DESCRIPTION OF THE DRAWINGS

The features and advantages of the disclosure will become apparent from a consideration of the subsequent detailed description presented in connection with the accompanying drawings in which:

FIG. 1B is a zoomed in view of FIG. 1a;

FIG. 3b is a zoomed in view of FIG. 3a;

FIG. 6a is another partial cutaway view of the hydraulic jack of FIG. 4, along a fluid path to a weight gauge;

FIG. 6b is a bottom view of a piston of the hydraulic jack of FIG. 4;

FIG. 9a is a cross-sectional view of the hydraulic jack of FIG. 7;

FIG. 9b is a bottom view of a piston of the hydraulic jack of FIG. 7;

FIG. 11b is a cross-sectional view of the hydraulic jack of FIG. 7 with a release valve in an open position;

DETAILED DESCRIPTION

Figure 1A:
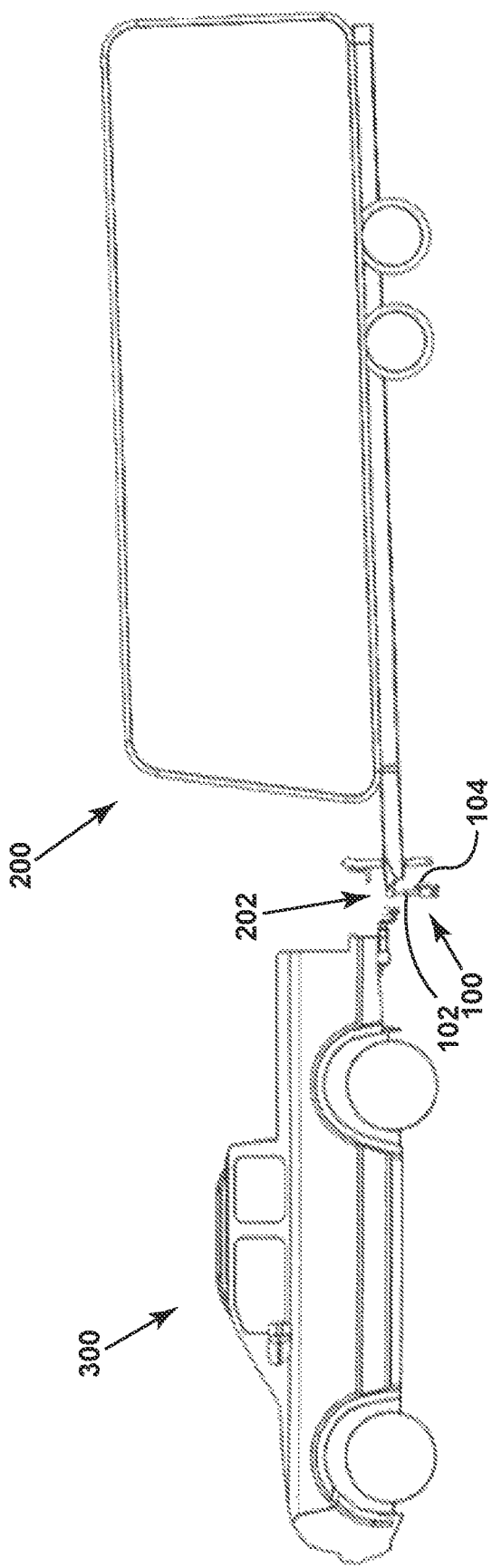
FIG. 1a is a side view of a jack being used to measure the weight of a trailer tongue, in accordance with the principles of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein, the term "weight" will refer to a downward force exerted by an object.

As used herein, the term "force" will refer the mathematical calculation of F=PA, where F=force; P=pressure; and A=the area upon which the force is being applied.

As used herein, the terms "lift" and "jack" are synonyms and can be used interchangeably to broadly identify any device used to lift or push an object in any desired direction including, but not limited to, vertical or horizontal.

As used herein, the term "hydraulic" broadly refers to the use of pressurized fluid to cause movement of an object or objects.

As used herein, the phrase "consisting of" and grammatical equivalents thereof exclude any element, step, or feature not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Applicant has discovered a system and method of weighing vehicles and trailers using a unique hydraulic jack that is configured and arranged in accordance with the knowledge and abilities of those having ordinary skill in the relevant field, to convert the internal fluid pressure of the jack when the jack has lifted a vehicle or trailer, into a weight measurement, representing the weight or force being loaded onto the jack by a separate independent object, such as but not limited to a vehicle or trailer.

Figure 1B:
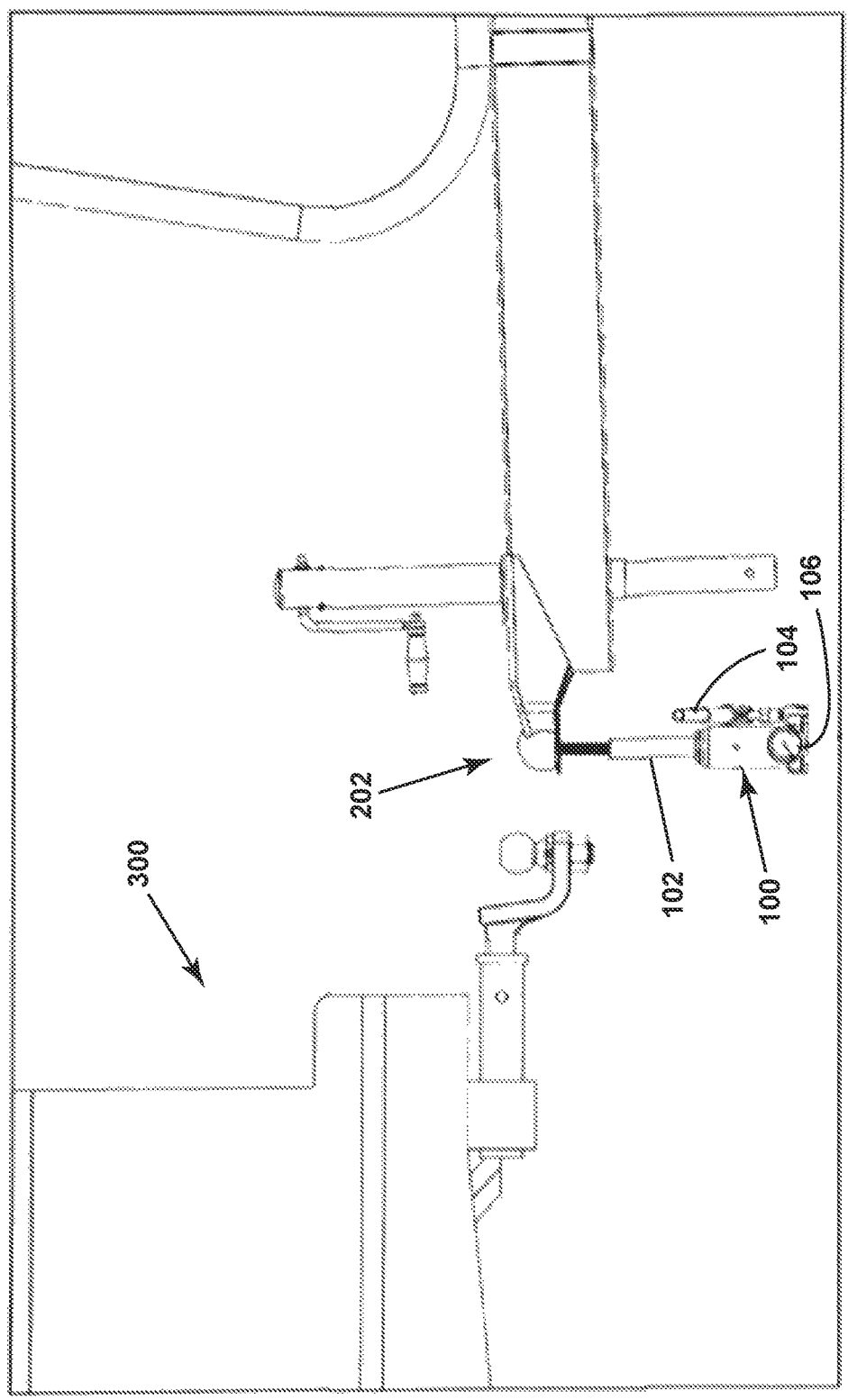

Referring now to FIGS. 1a and 1b, a jack 100 of the current disclosure is shown in use, being used to measure a weight of a trailer 200 tongue 202. In this exemplary illustration the jack 100 may include piston 102 that can be positioned beneath or underneath and engaged with the tongue 202 of the trailer 200. The jack 100 may be actuated by pumping a handle 104 which can actuate or move the piston 102 upward causing the tongue 202 of the trailer 200 to lift substantially vertically off the ground or surrounding surface upon which the trailer is resting.

As the piston 102 lifts the tongue 202 off the ground or surrounding surface, a weight gauge 106 of the jack 100 provides or identifies a weight measurement of the tongue 202.

Figure 2:
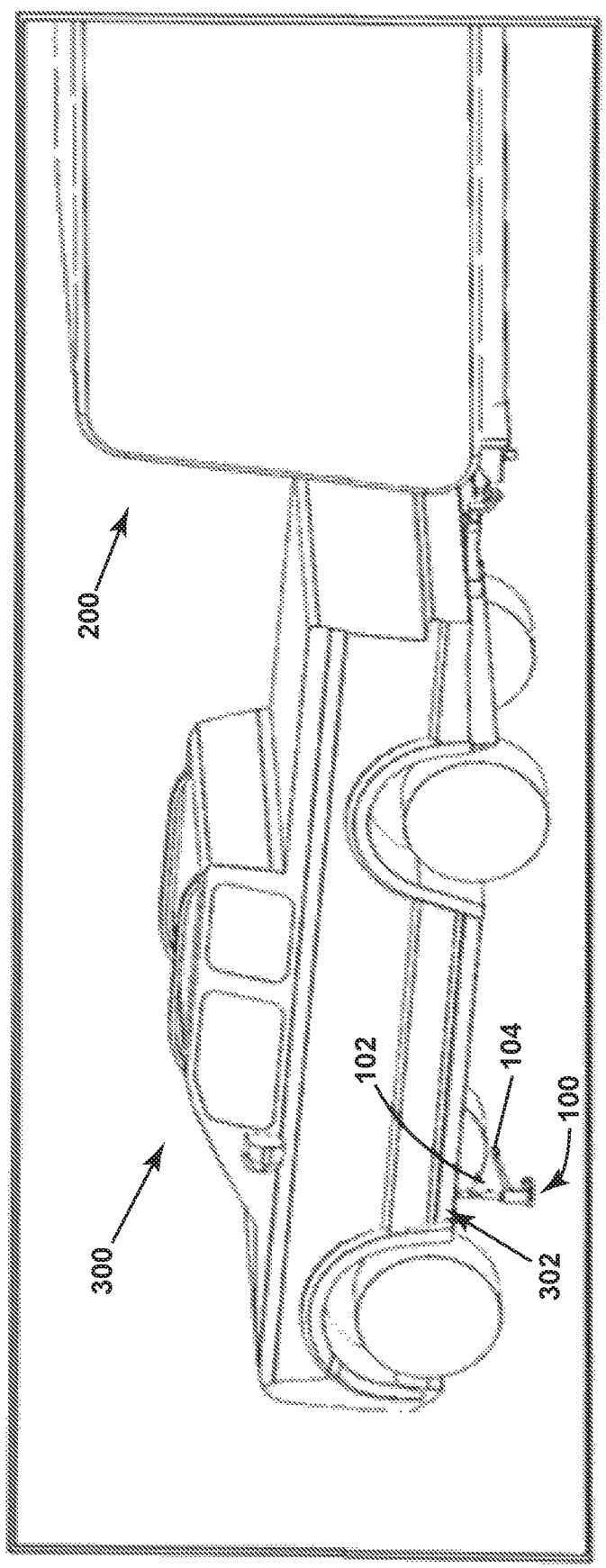
FIG. 2 is a side view of a jack being used to measure the weight of a vehicle, in accordance with the principles of the present disclosure.

Referring now to FIG. 2, the jack 100 of the current disclosure is shown in use, being used to measure a weight of a vehicle 300. In this exemplary illustration the piston 102 of the jack 100 can be positioned beneath or underneath and engaged with a chassis 302, or axle or other desired location on the vehicle 300. The jack 100 may be actuated by pumping the handle 104 which can actuate the piston 102 upward causing the vehicle 300 to lift substantially vertically off the ground or surrounding surface upon which the vehicle is resting.

As the piston 102 lifts the vehicle 300, or a portion of the vehicle 300, off the ground or surrounding surface, the weight gauge 106 of the jack 100 provides or identifies a weight measurement of the vehicle 300, or portion of the vehicle 300.

Figure 3A:
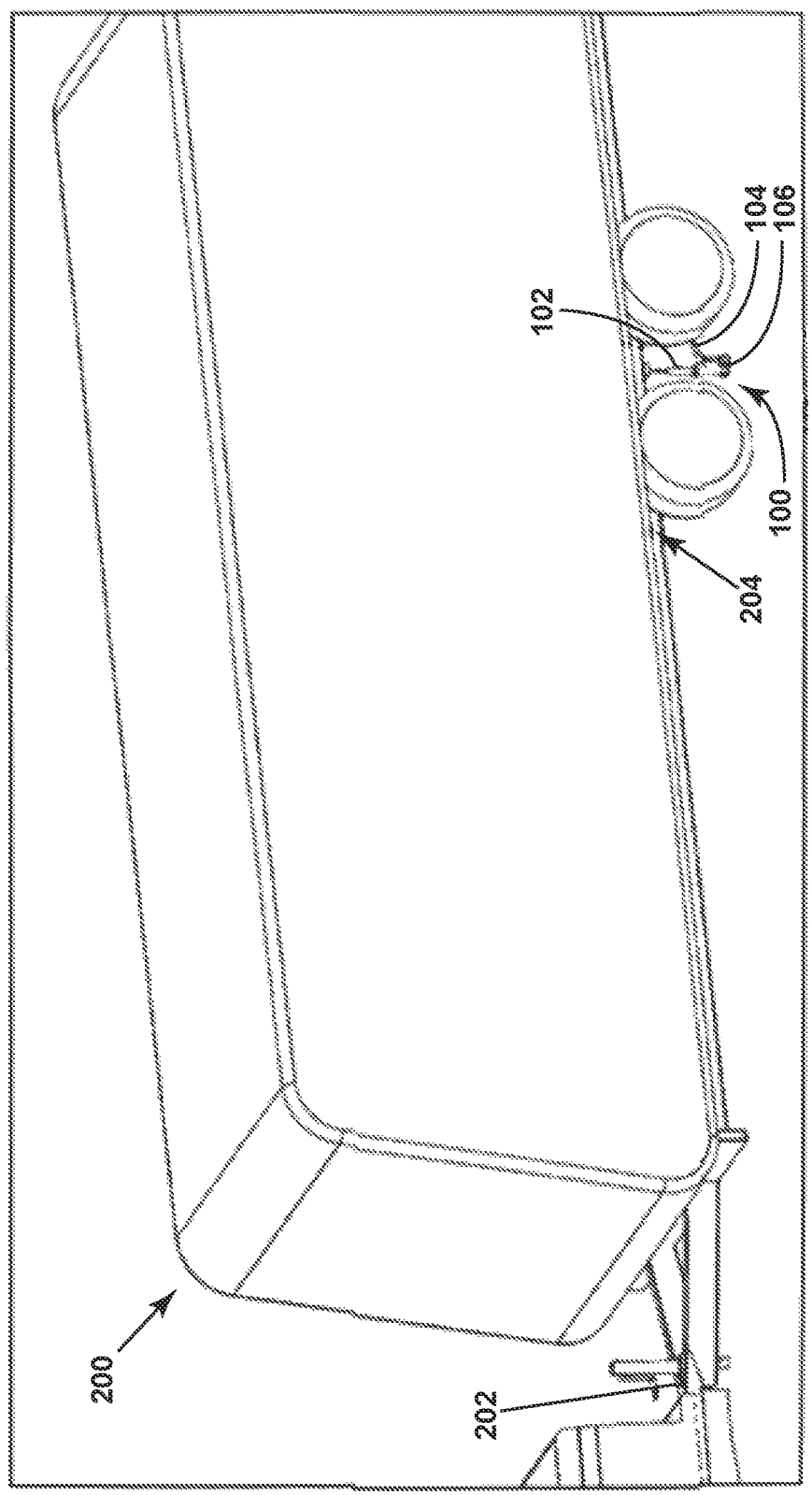
FIG. 3a is a side view of a jack being used to measure the weight of a trailer, in accordance with the principles of the present disclosure.
Figure 3B:
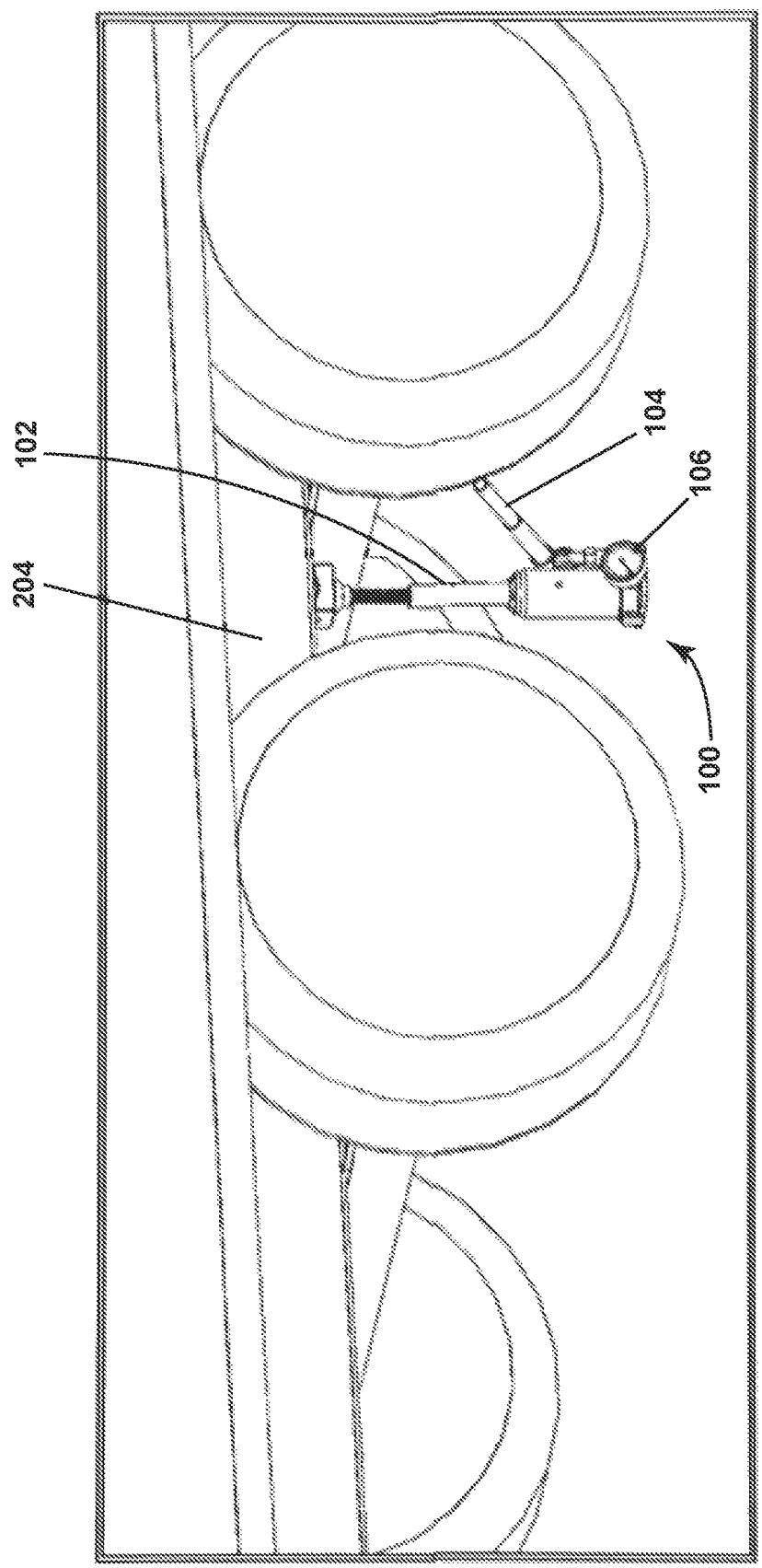
Figure 4:
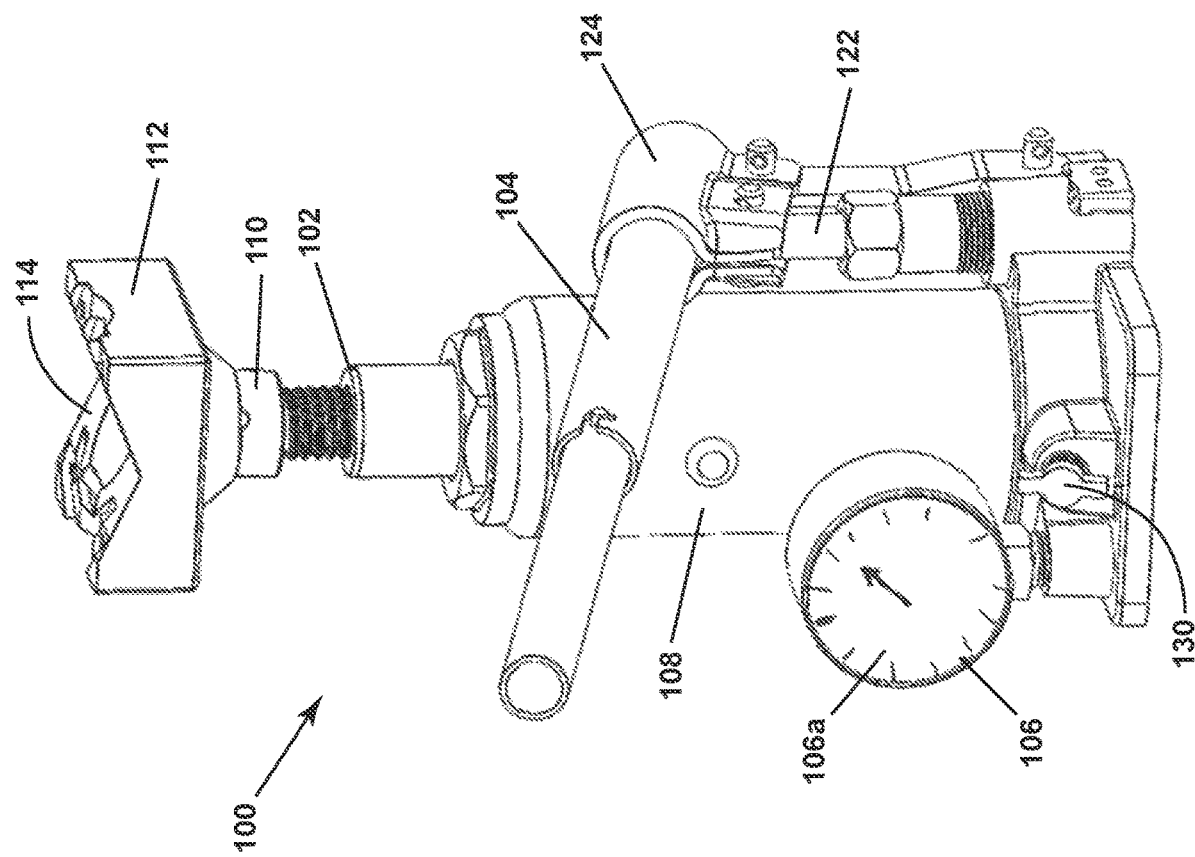
FIG. 4 is perspective view of an embodiment of an hydraulic jack, in accordance with the principles of the present disclosure.
Figure 5:
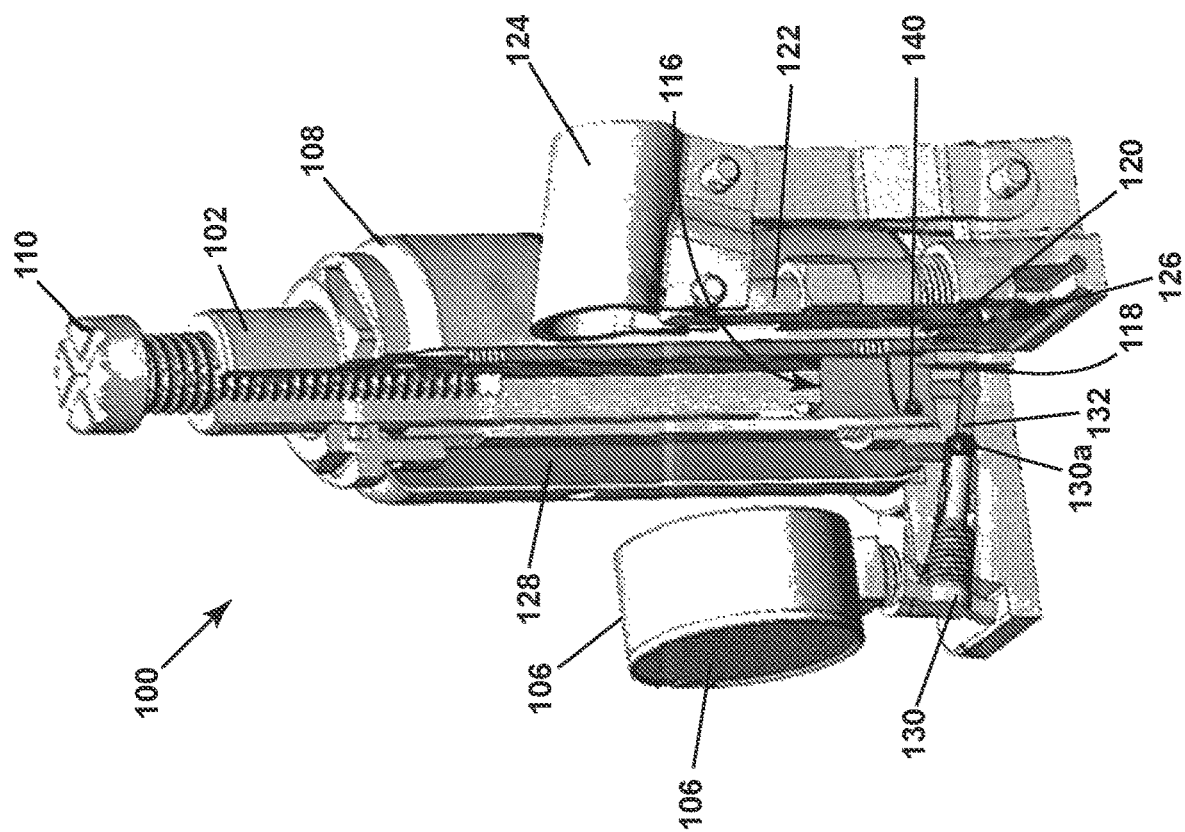
FIG. 5 is a partial cutaway view of the hydraulic jack of FIG. 4, along a fluid path to a release valve.
Figure 7:
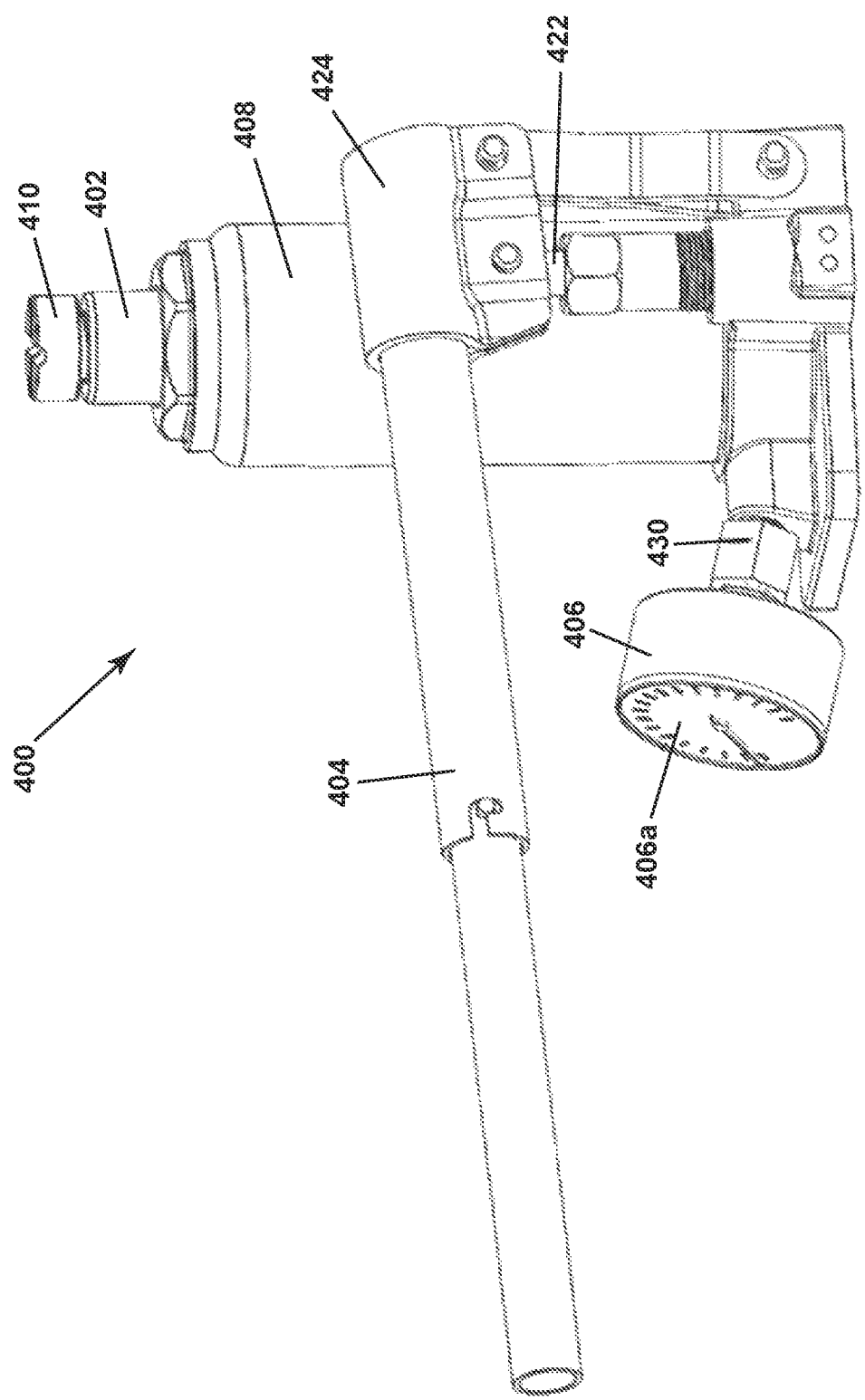
FIG. 7 is perspective view of another embodiment of an hydraulic jack, in accordance with the principles of the present disclosure.
Figure 8:
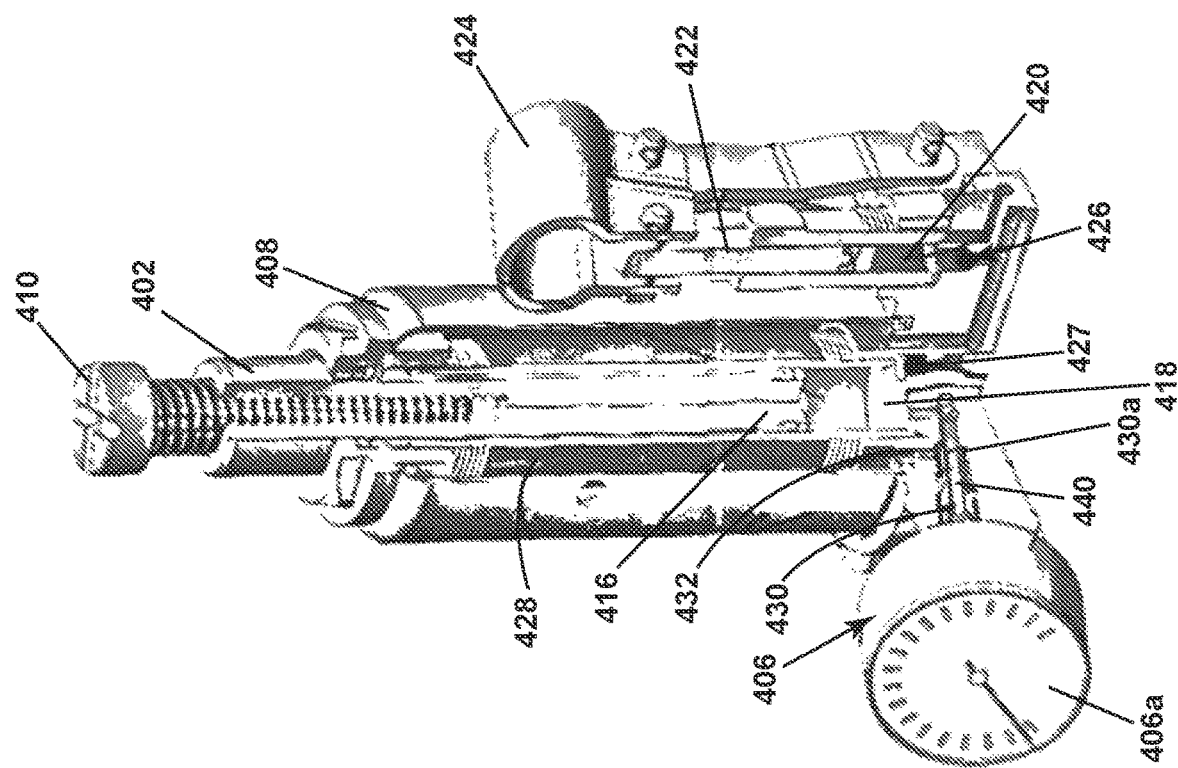
FIG. 8 is a partial cutaway view of the hydraulic jack of FIG. 7.
Figure 10A:
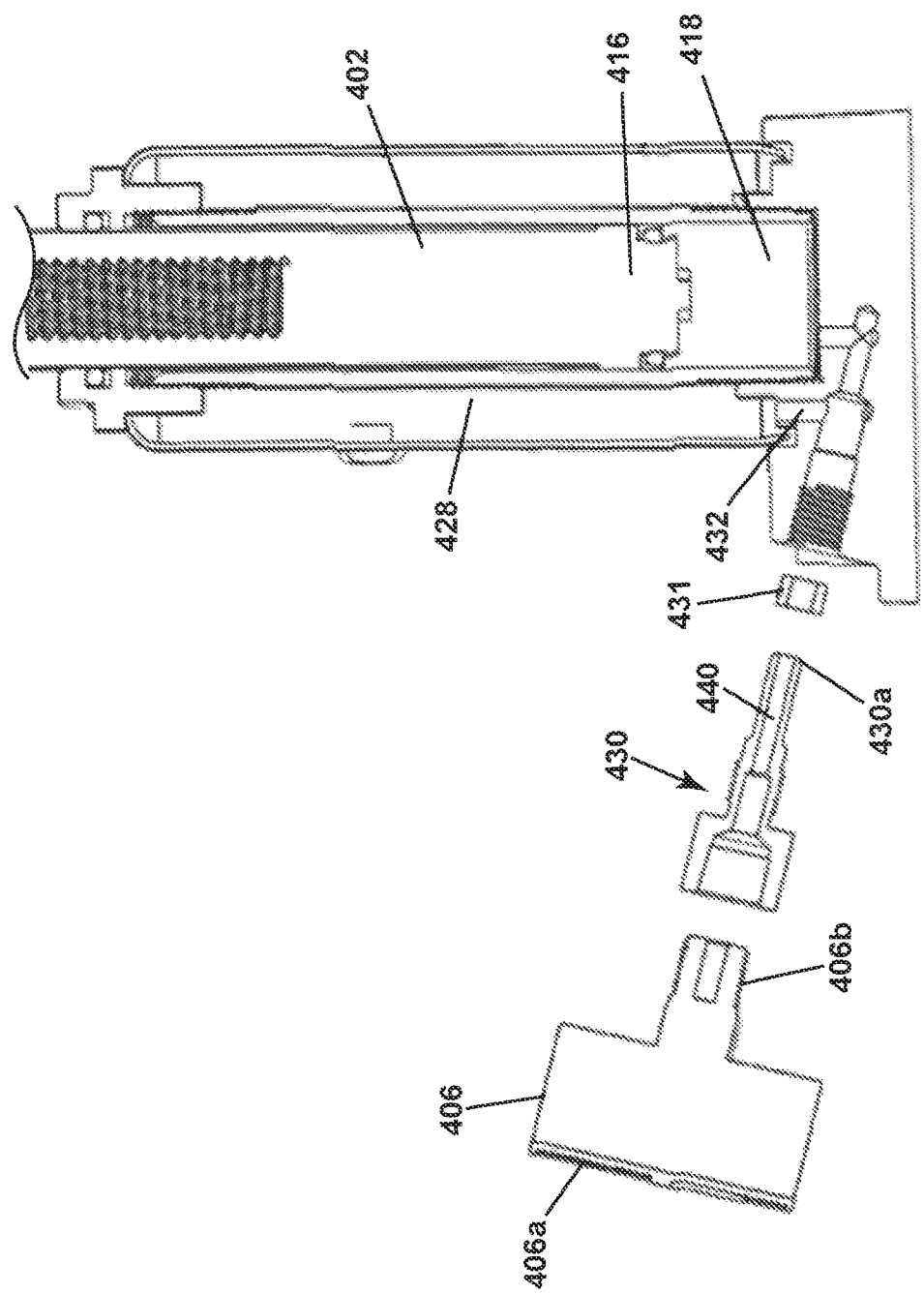
FIG. 10a is partially exploded cross-sectional view of the hydraulic jack of FIG. 7.
Figure 10B:
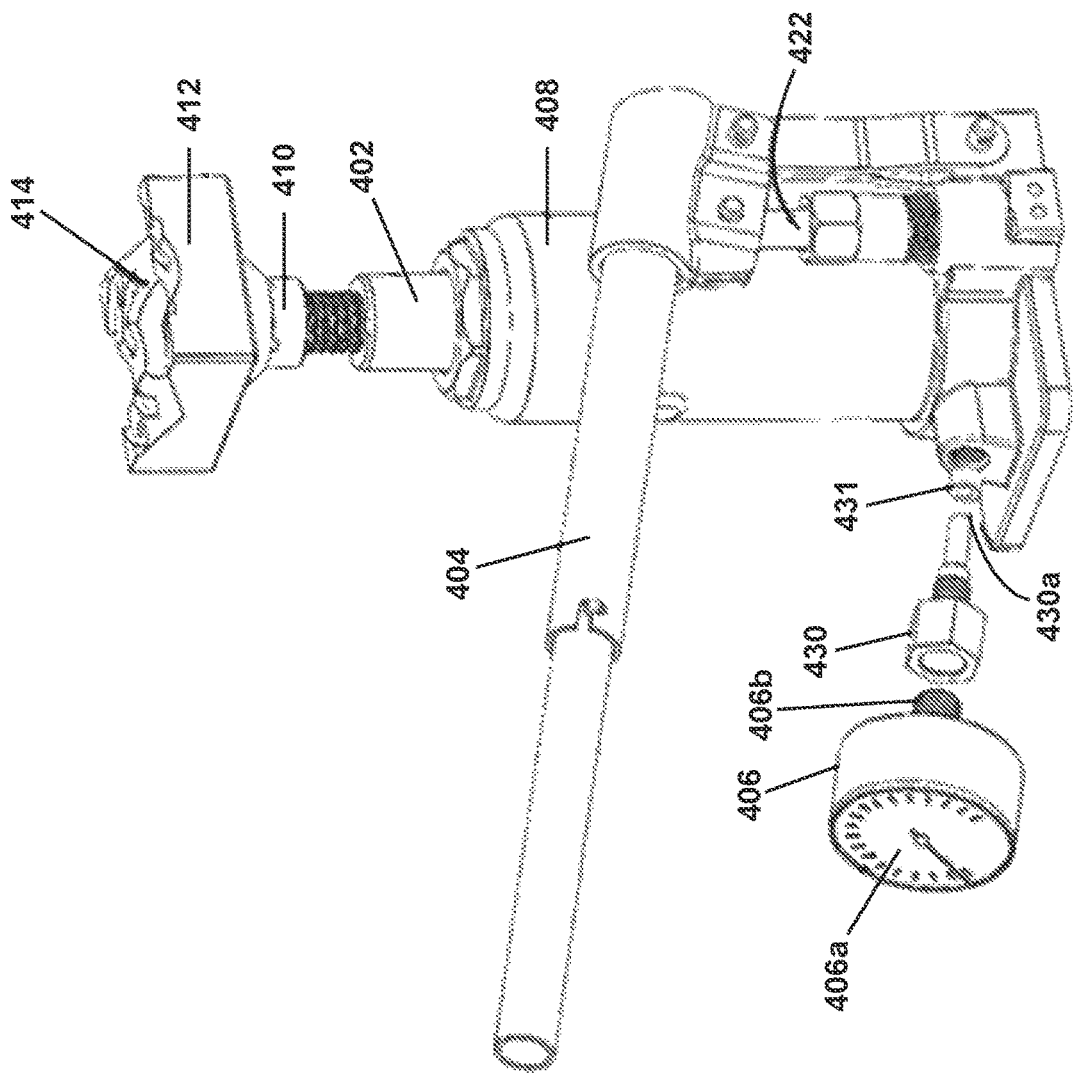
FIG. 10b is a partially exploded perspective view of the hydraulic jack of FIG. 7.

Referring now to FIGS. 3a and 3b, the jack 100 of the current disclosure is shown in use, being used to measure a weight of the trailer 200. In this exemplary illustration the piston 102 of the jack 100 can be positioned beneath or underneath and engaged with a frame 204 of the trailer 200. The jack 100 may be actuated by pumping the handle 104 which can actuate the piston 102 upward causing the trailer 200 to lift substantially vertically off the ground or surrounding surface upon which the trailer 200 is resting.

As the piston 102 lifts the trailer 200, or a portion of trailer 200, off the ground or surrounding surface, the weight gauge 106 of the jack 100 provides or identifies a weight measurement of the trailer 200, or portion of the trailer 200.

Referring now to FIGS. 4-6b, the jack 100 may include a housing 108 configured to receive the piston 102 which extends partial outside of the housing 108 and extends partially into an interior of the housing 108. The piston includes a lift surface 110 at a first terminal end of the piston 102 which can be used to engage with and lift or push an independent and separate object. The lift surface 110 may also engage with, be connected to, or be attached to lift adaptor 112. The lift adaptor 112 be designed and configured to provide a custom engagement surface 114 to better provide a flush and/or secure engagement with whatever object is to be pushed or lifted by the jack 100.

The lift adaptor 112 may be formed as a separate and detachable piece from the piston 102 and lift surface 110, or the lift adaptor may be formed as a single, integral, unitary piece with the piston 102 and lift surface 110. The engagement surface 114 may be formed having a substantially V-shaped contour which may aid in centering an object or portion of an object onto the jack 100 during use of the jack 100 to lift or push said object.

The piston 102 may include a second terminal end 116 which can seal off a high pressure fluid chamber 118, enclosed within the housing 108. The high pressure fluid chamber 116 may be in fluid communication a charge piston chamber 120. A charge piston 122 may be received by and seal the charge piston chamber 120. The charge piston 122 can be actuated by the handle 104 that is received by the handle holder 124 which is connected and engaged with the charge piston 122.

In use, as the handle 104 actuates the charge piston 122 fluid is drawn into the charge piston chamber 120 as the charge piston 122 is raised with respect to the charge piston chamber 120. The fluid is drawn through a first check valve 126 that only permits flow of fluid from a low pressure chamber 128 into the charge piston chamber 120 when the charge piston 122 is raised.

As the charge piston 122 is lowered, via further actuation by the handle 104 and handle holder 124, the fluid is pushed through a second check valve (not shown), which only permits the flow of fluid from the charge piston chamber 120 into the high pressure fluid chamber 118. As the fluid is pushed into the high pressure fluid chamber 118, the pressure and volume of the fluid increases and pushes on or moves the piston 102, actuating or moving the piston 102 further out of the housing 108. As the piston in actuated further out of the housing 108, the object to be pushed or lifted is pushed or lifted via engagement with the piston 102 as it is being actuated further out of the housing 108.

The jack 100 may also include a release valve 130. The release valve 130 can be in threaded engagement with the housing 108, such that as the release valve 130 is turned or tightened a terminal end 130a of the release valve 130 closes off a fluid passage 132 fluidically connecting, or creating a fluid communication with, the high pressure fluid chamber 118 with the low pressure fluid chamber 128. When the release valve 130 is in the tightened or closed position, the fluid pressure within the high pressure fluid chamber 118 can only be maintained or increased.

In use, if a user wants to lower or retract the piston 102 further inside of the housing 108, then the fluid pressure within the high pressure fluid chamber must be reduced. This is accomplished by loosening or opening the release valve 130 which will in turn open the fluid passage 132 between the high pressure fluid chamber 118 and the low presser fluid chamber 128, allowing fluid to transfer from the high pressure fluid chamber 118 to the low pressure fluid chamber 128, thereby reducing the fluid level and fluid pressure within the high pressure fluid chamber 118, which can then further retract the piston 102 into the housing 108. Actuating or altering the fluid pressure and volume of the fluid within the high pressure fluid chamber can cause the piston to move further into or out of the housing 108 respectively.

As more specifically illustrated in FIG. 6a, the weight gauge 106, or force gauge, can be in constant fluid communication with the high pressure fluid chamber 118 via a fluid passage 140. The weight gauge 106 may be a pressure gauge calibrated to show force, based at least in part, on an operating piston diameter and also factoring for specific internal system losses. An opening of fluid path 140 is shown and referenced, as reference numeral 140 in FIG. 5. The fluid passage 140 may be continuously open allowing the fluid pressure to remain the same throughout the high pressure fluid chamber 118 and through the fluid passage 140 up to the weight gauge 106. The fluid passage 140 may be separate and distinct from the fluid passage 132 which can be opened or closed by the release valve 130.

The weight gauge 106 may be removable from the housing 108 via a removable engagement such as a threaded engagement 106b with the housing 108 or other desired engagement. Alternatively, The weight gauge 106 may be manufactured as an unitary, integral part of the housing 108.

The weight gauge 106, or force gauge, is designed and configured to measure the fluid pressure within the fluid passage 140 and is calibrated to convert the measured fluid pressure to a weight or force measurement output. This force or weight measurement output, as applied to the piston 102, can then be displayed on a display surface 106a of the weight gauge 106. The calibration of the of the weight gauge 106 can be based or factored, at least in part, on the surface area $A_1$ or diameter $D_1$ of the terminal end 116 of the piston 102. Additionally, the weight gauge 106 may factor specific internal system losses when calibrating for more accurate weight or force measurements. In additional embodiments, the weight gauge 106 can include weight or force measuring mechanisms such as a deflected spring, load cell or other desired or suitable force measurement mechanism. In yet another embodiment, the weight gauge 106 may be configured to transmit a weight or force measurement to a remote display, or may store multiple weight or force measurements that could be displayed together or separately, as desired.

The weight or force output of the weight gauge 106 may be calibrated and displayed in any desired force or weight units, including, but not limited to, pounds or kilograms. The display surface 106a may also be designed and configured as a analog readout or measurement, or a digital readout or measurement.

The jack 100 may also be used in any desired orientation. As non-limiting examples, the jack may be used to lift objects, or at least portions of objects, such as vehicles or trailers in a substantially vertical direction, or the jack 100 may be used to push an object in a substantially horizontal or a substantially non-vertical direction. In any orientation, the weight gauge 106 may still measure the force exerted on the piston 102 during use, essentially, to measure weight or force.

Referring now to FIGS. 7-11b, the jack 400 may include a housing 408 configured to receive the piston 402 which extends partially outside of the housing 408 and extends partially into an interior of the housing 408. The piston 402 includes a lift surface 410 at a first terminal end of the piston 402 which can be used to engage with and lift or push an independent and separate object, or portions thereof. The lift surface 410 may also engage with or be attached to a lift adaptor 412, shown in FIG. 10b. The lift adaptor 412 may be designed and configured to provide a custom engagement surface 414 to better provide a flush and/or secure engagement with whatever object is to be pushed or lifted by the jack 400.

The lift adaptor 412 may be formed as a separate and detachable piece from the piston 402 and lift surface 410, or the lift adaptor 412 may be formed as a single, integral, unitary piece with the piston 402 and lift surface 410. The engagement surface 414 may be formed having a substantially V-shaped contour which may aid in centering an object or portion of an object onto the jack 400 during use of the jack 400 to lift or push said object.

The piston 402 may include a second terminal end 416 which can seal off a high pressure fluid chamber 418, enclosed within the housing 408. The high pressure fluid chamber 416 may be in fluid communication a charge piston chamber 420. A charge piston 422 may be received by and seal the charge piston chamber 420. The charge piston 422 can be actuated by the handle 404 that is received by the handle holder 424 which is connected and engaged with the charge piston 422.

In use, as the handle 404 actuates the charge piston 422 fluid is drawn into the charge piston chamber 420 as the charge piston 422 is raised with respect to the charge piston chamber 420. The fluid is drawn through a first check valve 426 that only permits flow of fluid from a low pressure fluid chamber 428 into the charge piston chamber 420 when the charge piston 422 is raised.

As the charge piston 422 is lowered, via further actuation by the handle 404 and handle holder 424, the fluid is pushed through a second check valve 427, which only permits the flow of fluid from the charge piston chamber 420 into the high pressure fluid chamber 418. As the fluid is pushed into the high pressure fluid chamber 418, the pressure of the fluid increases and pushes on the piston 402, actuating the piston 402 further out of the housing 408. As the piston is actuated further out of the housing 408, the object to be pushed or lifted is pushed or lifted via engagement with the piston 402 as it is being actuated further out of the housing 408.

The jack 400 may also include a release valve 430. The release valve 430 can be in threaded engagement with the housing 408, such that as the release valve 430 is turned or tightened a terminal end 430a of the release valve 430 closes off a fluid passage 432 fluidically connecting, or creating a fluid communication with, the high pressure fluid chamber 418 with the low pressure fluid chamber 428. When the release valve 430 is in the tightened or closed position, the fluid pressure within the high pressure fluid chamber 418 can only be maintained or increased. The release valve 430 may also be configured to receive a seal 431 which further aids in ensuring a fluid tight connection between the release valve 430 and the housing 408.

In use, if a user wants to lower or retract the piston 402 further inside of the housing 408, then the fluid pressure within the high pressure fluid chamber 418 must be reduced.

This is accomplished by loosening or opening the release valve 430 which will in turn open the fluid passage 432 between the high pressure fluid chamber 418 and the low presser fluid chamber 428, allowing fluid to transfer from the high pressure fluid chamber 418 to the low pressure fluid chamber 428, thereby reducing the fluid level and fluid pressure within the high pressure fluid chamber 418, which can then further retract the piston 402 into the housing 408.

Figure 11A:
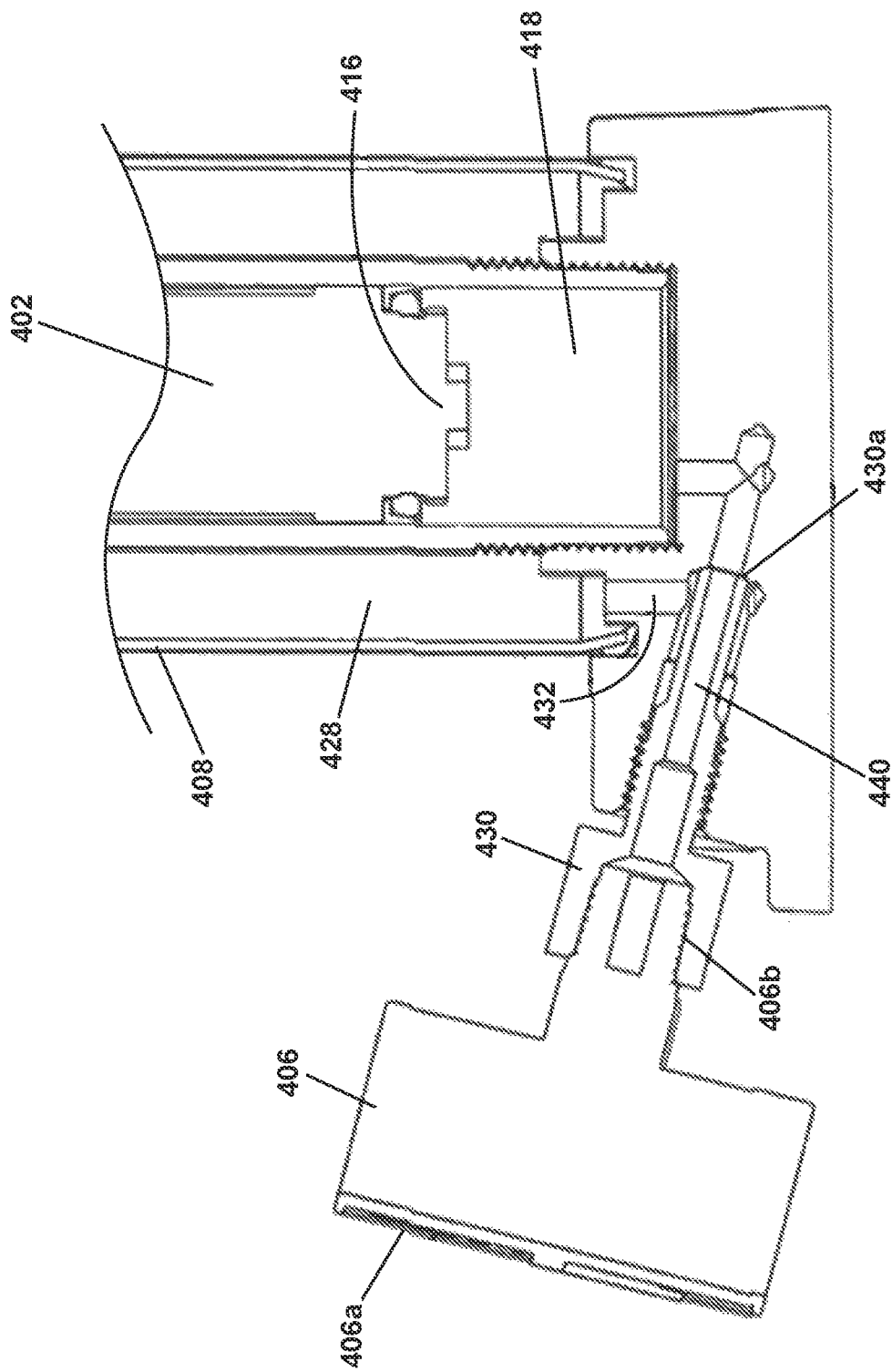
FIG. 11a is a cross-sectional view of the hydraulic jack of FIG. 7 with a release valve in a closed position.

As more specifically illustrated in FIGS. 11a and 11b, a weight gauge 406, or force gauge, can be in fluid communication with the high pressure fluid chamber 118 via a through port 440 in the release valve 430. The through port 440 may be open and fluidically connected with, or creating a fluid communication with, the high pressure fluid chamber 418, when the release valve 430 is in the closed position (shown in FIG. 11a) allowing the fluid pressure to remain the same throughout the high pressure fluid chamber 418 and through port 440, and up to the weight gauge 406. The through port 440 may be separate and distinct from the fluid passage 432 which can be opened or closed by the release valve 430.

The weight gauge 406 may be removable from the valve 430 via a removable engagement such as a threaded engagement 406b with the valve 430 or other desired engagement. Alternatively, the weight gauge 406 may be manufactured as an unitary, integral part of the valve 430.

The weight gauge 406 may be designed and configured to measure the fluid pressure within the high pressure fluid chamber 418 and may be calibrated to convert the measured fluid pressure to a weight or force measurement output. This force or weight measurement output can then be displayed on a display surface 406a of the weight gauge 406. The calibration of the of the weight gauge 406 can be based or factored, at least in part, on the surface area $A_2$ or diameter $D_2$ of the terminal end 416 of the piston 402. The weight gauge 406 may also factor specific internal system losses into a more accurate weight or force measurement. In additional embodiments, the weight gauge 406 can include weight or force measuring mechanisms such as a deflected spring, load cell or other desired or suitable force measurement mechanism.

The weight or force output of the weight gauge 406 may be calibrated and displayed in any desired force or weight units, including, but not limited to, pounds or kilograms. The display surface 406a may also be designed and configured as a analog readout or measurement, or a digital readout or measurement.

The jack 400 may also be used in any desired orientation. As non-limiting examples, the jack may be used to lift objects such as vehicles or trailers in a substantially vertical direction, or the jack 400 may be used to push an object in a substantially horizontal or a substantially non-vertical direction. In any orientation, the weight gauge 406 may still measure the force exerted on the piston 402 during use, essentially, to measure weight or force.

Figure 12:
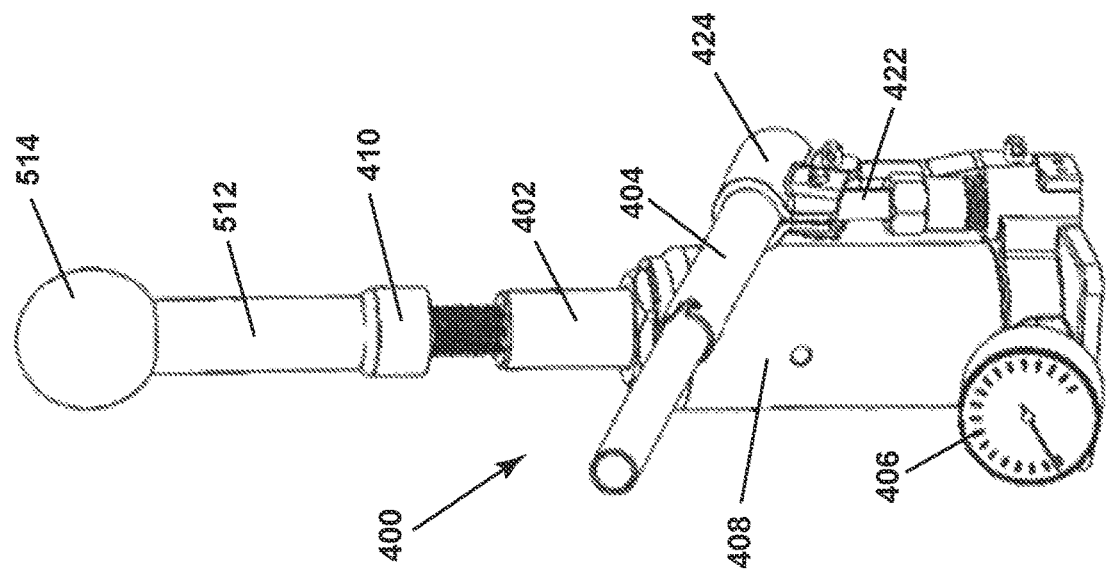
FIG. 12 is a perspective view of the hydraulic jack of FIG. 7 with an alternative lift adaptor.

Referring to FIG. 12, another embodiment of the disclosure includes a lift adaptor 512 may be engaged may engage with or be attached to lift surface 410 of jack 400. Although not shown, it is to be understood that lift adaptor 512 can also be engaged in the same or similar way to lift surface 110 of jack 100, as with lift surface 410 of jack 400. The lift adaptor 512 may be designed and configured to provide a custom engagement surface 514 to better provide a flush and/or secure engagement with whatever object is to be pushed or lifted by the jack 400.

The lift adaptor 512 may be formed as a separate and detachable piece from the piston 402 and lift surface 410, or the lift adaptor 512 may be formed as a single, integral, unitary piece with the piston 402 and lift surface 410. The engagement surface 514 may be formed having a substantially spherical shape or contour which may aid in engagement with a ball coupler or gooseneck-type connection during use of the jack 400 to lift or push said object.

Figure 13:
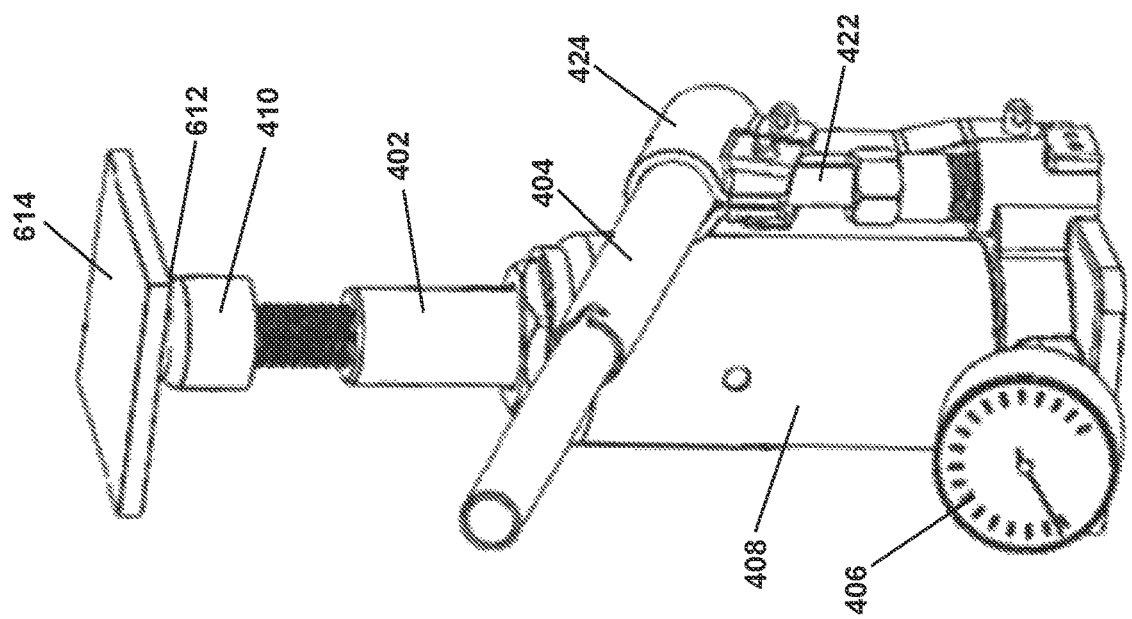
FIG. 13 is a perspective view of the hydraulic jack of FIG. 7 with an alternative lift adaptor.

Referring to FIG. 13, another embodiment if the disclosure includes a lift adaptor 612 may be engaged may engage with or be attached to lift surface 410 of jack 400. Although not shown, it is to be understood that lift adaptor 512 can also be engaged in the same or similar way to lift surface 110 of jack 100, as with lift surface 410 of jack 400. The lift adaptor 612 may be designed and configured to provide a custom engagement surface 614 to better provide a flush and/or secure engagement with whatever object is to be pushed or lifted by the jack 400.

The lift adaptor 612 may be formed as a separate and detachable piece from the piston 402 and lift surface 410, or the lift adaptor 612 may be formed as a single, integral, unitary piece with the piston 402 and lift surface 410. The engagement surface 614 may be formed having a substantially flat surface which may aid in distributing force over a wider surface area during use of the jack 400 to lift or push said object.

Figure 14:
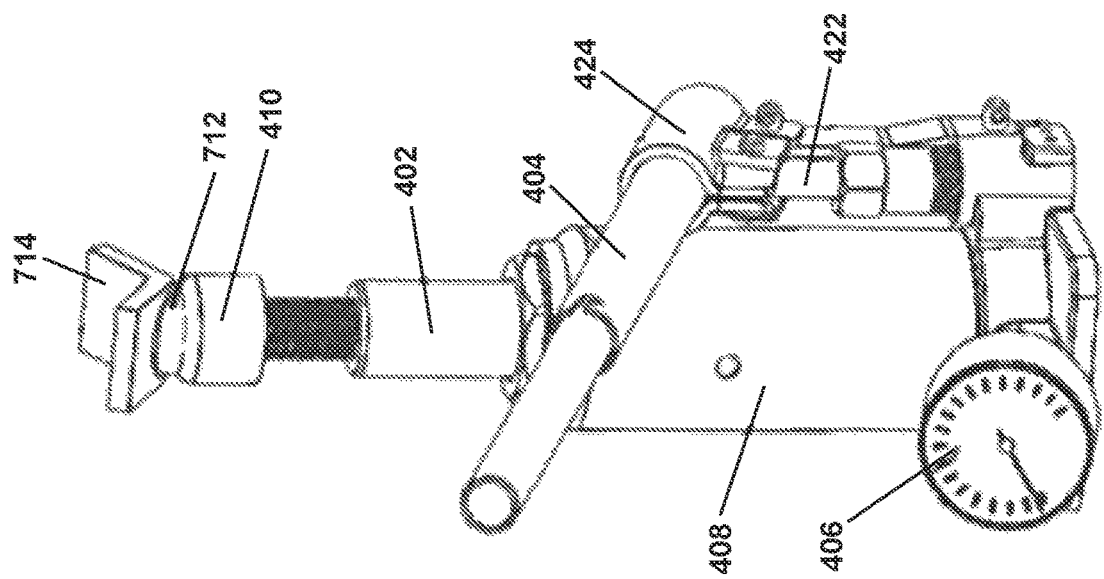
FIG. 14 is a perspective view of the hydraulic jack of FIG. 7 with an alternative lift adaptor.

Referring to FIG. 14, another embodiment if the disclosure includes a lift adaptor 712 may be engaged may engage with or be attached to lift surface 410 of jack 400. Although not shown, it is to be understood that lift adaptor 712 can also be engaged in the same or similar way to lift surface 110 of jack 100, as with lift surface 410 of jack 400. The lift adaptor 712 may be designed and configured to provide a custom engagement surface 714 to better provide a flush and/or secure engagement with whatever object is to be pushed or lifted by the jack 400.

The lift adaptor 712 may be formed as a separate and detachable piece from the piston 402 and lift surface 410, or the lift adaptor 712 may be formed as a single, integral, unitary piece with the piston 402 and lift surface 410. The engagement surface 714 may be formed having a substantially V-shaped contour which may aid in centering an object or portion of an object, such as a cylindrical axle, for example, onto the jack 400 during use of the jack 400 to lift or push said object.

Figure 15:
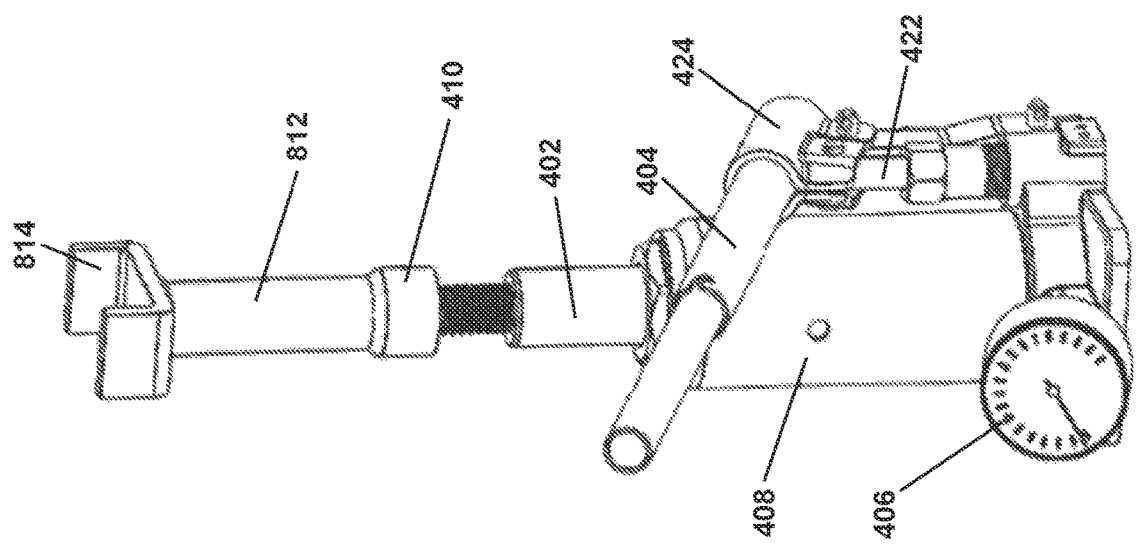
FIG. 15 is a perspective view of the hydraulic jack of FIG. 7 with an alternative lift adaptor.

Referring to FIG. 15, another embodiment if the disclosure includes a lift adaptor 812 may be engaged may engage with or be attached to lift surface 410 of jack 400. Although not shown, it is to be understood that lift adaptor 812 can also be engaged in the same or similar way to lift surface 110 of jack 100, as with lift surface 410 of jack 400. The lift adaptor 812 may be designed and configured to provide a custom engagement surface 814 to better provide a flush and/or secure engagement with whatever object is to be pushed or lifted by the jack 400.

The lift adaptor 812 may be formed as a separate and detachable piece from the piston 402 and lift surface 410, or the lift adaptor 812 may be formed as a single, integral, unitary piece with the piston 402 and lift surface 410. The engagement surface 814 may be formed having a substantially U-shaped or trough-like contour having a substantially flat bottom surface, which may aid in centering an object or portion of an object, such as a trailer tongue or frame, for example, onto the jack 400 during use of the jack 400 to lift or push said object.

Figure 16:
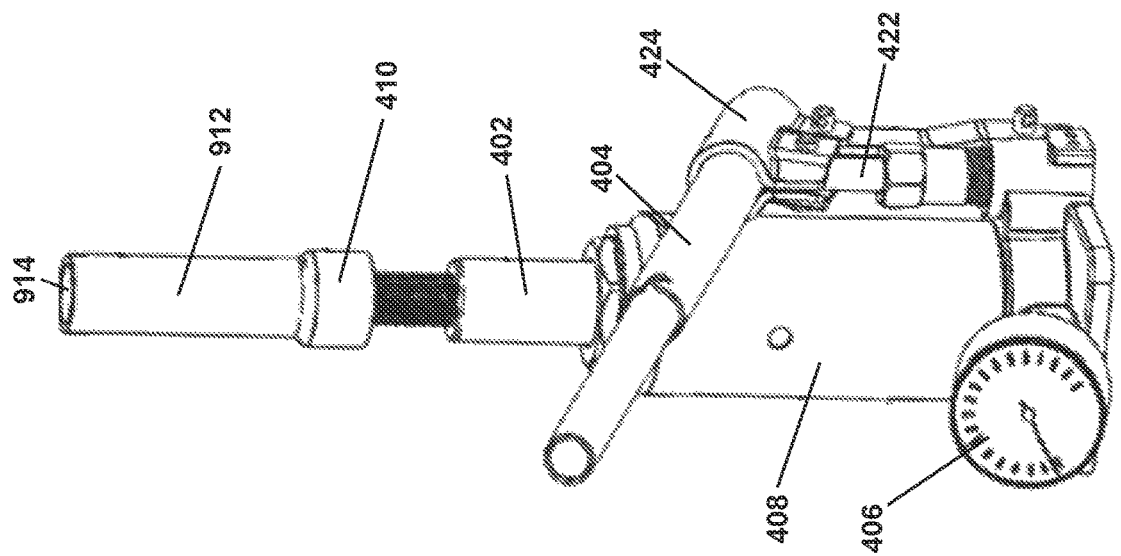
FIG. 16 is a perspective view of the hydraulic jack of FIG. 7 with an alternative lift adaptor.

Referring to FIG. 16, another embodiment if the disclosure includes a lift adaptor 912 may be engaged may engage with or be attached to lift surface 410 of jack 400. Although not shown, it is to be understood that lift adaptor 912 can also be engaged in the same or similar way to lift surface 110 of jack 100, as with lift surface 410 of jack 400. The lift adaptor 912 may be designed and configured to provide a custom engagement surface 914 to better provide a flush and/or secure engagement with whatever object is to be pushed or lifted by the jack 400.

The lift adaptor 912 may be formed as a separate and detachable piece from the piston 402 and lift surface 410, or the lift adaptor 912 may be formed as a single, integral, unitary piece with the piston 402 and lift surface 410. The engagement surface 914 may be formed having a substantially hollow cylindrical-shaped contour which may aid in receiving cylindrical objects such as a post of a trailer tongue jack, for example, onto the jack 400 during use of the jack 400 to lift or push said object.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A force measurement device comprising:
    a jack having:
        a piston, configured to engage an object to be lifted or pushed;
        a housing, wherein the housing includes a high pressure chamber configured to receive at least a portion of the piston, wherein altering a pressure within the high pressure chamber can actuate the piston to move further into or out of the housing;
        a release valve in fluid communication with the high pressure chamber and configured to release pressure within the high pressure chamber; and
        a force gauge attached to the housing and configured to measure a force applied to the piston by the object to be lifted or pushed;
        wherein the force gauge and the release valve utilize the same fluid connections to the high pressure chamber.
2. The device of claim 1, wherein the force gauge is in fluid communication with the high pressure chamber.
3. The device of claim 1, wherein the jack is a hydraulic jack.
4. The device of claim 1, wherein the force gauge is calibrated to measure weight of the object to be lifted or pushed.
5. The device of claim 1, wherein the force gauge includes a display configured to display the measured force in pounds or kilograms.
6. The device of claim 1, wherein the force gauge is calibrated to measure weight by factoring the surface area of a terminating end of the piston within the high pressure chamber.
7. The device of claim 1, wherein the force gauge includes a digital display.
8. The device of claim 1, wherein the force gauge includes an analog display.
9. The device of claim 1, wherein the force gauge is removable from the housing.
10. The device of claim 1, wherein the jack is configured to lift a vehicle or trailer.
11. The device of claim 1, wherein the jack includes a lift adaptor connected to the piston, wherein the lift adaptor includes a V-shaped engagement surface.
12. The device of claim 1, wherein the jack includes a lift adaptor connected to the piston, wherein the lift adaptor includes a substantially spherical engagement surface.
13. The device of claim 1, wherein the jack includes a lift adaptor connected to the piston, wherein the lift adaptor includes a substantially cylindrical engagement surface.
14. A hydraulic jack comprising:
    a piston, configured to lift at least a portion of a vehicle or trailer;
    a housing, wherein the housing includes a high pressure fluid chamber configured to receive at least a portion of the piston, wherein increasing fluid pressure within the high pressure chamber moves the piston further out of the housing;
    a release valve in fluid communication with the high pressure fluid chamber and configured to release pressure within the high pressure fluid chamber; and
    a weight gauge attached to the housing and in fluid communication with the high pressure fluid chamber, wherein the weight gauge is configured and calibrated to measure and display the weight of the vehicle or trailer being lifted by the piston;
    wherein the weight gauge and the release valve utilize the same fluid communication with the high pressure fluid chamber.
15. The device of claim 14, wherein the weight gauge is configured to display the measured weight in pounds or kilograms.
16. The device of claim 14, wherein the weight gauge is calibrated to measure weight by factoring the surface area of a terminating end of the piston within the high pressure fluid chamber.
17. The device of claim 14, wherein the weight gauge includes a digital display.
18. The device of claim 14, wherein the weight gauge includes an analog display.
19. The device of claim 14, wherein the weight gauge is removable from the housing.
20. The device of claim 14, further comprising:
    a lift adaptor connected to the piston, wherein the lift adaptor includes a V-shaped engagement surface.
21. The device of claim 14, further comprising:
    a lift adaptor connected to the piston, wherein the lift adaptor includes a substantially spherical engagement surface.
22. The device of claim 14, further comprising:
    a lift adaptor connected to the piston, wherein the lift adaptor includes a substantially cylindrical engagement surface.

23. The device of claim 14, wherein the weight gauge further comprises:
- a weight gauge configured and arranged to convert the internal fluid pressure of the jack when the jack has lifted a vehicle or trailer, into a weight measurement, representing the weight or force being loaded onto the jack by said vehicle or trailer.

24. A hydraulic jack comprising:
- a piston, configured to lift at least a portion of a vehicle or trailer;
- a housing, wherein the housing includes a high pressure fluid chamber configured to receive at least a portion of the piston, wherein increasing the fluid pressure within the high pressure chamber moves the piston further out of the housing;
- a release valve in fluid communication with the high pressure fluid chamber and configured to release pressure within the high pressure fluid chamber; and
- a weight gauge attached to the housing and in fluid communication with both the release valve and the high pressure fluid chamber, wherein the weight gauge is configured and calibrated to measure and display the weight of the vehicle or trailer being lifted by the piston;

wherein the weight gauge is removable from the release valve.

25. The device of claim 24, wherein the weight gauge is configured to display the measured weight in pounds or kilograms.

26. The device of claim 24, wherein the weight gauge is calibrated to measure weight by factoring the surface area of a terminating end of the piston within the high pressure fluid chamber.

27. The device of claim 24, wherein the weight gauge includes a digital display.

28. The device of claim 24, wherein the weight gauge includes an analog display.

29. The device of claim 24, further comprising:
- a lift adaptor connected to the piston, wherein the lift adaptor includes a V-shaped engagement surface.

30. The device of claim 24, further comprising:
- a lift adaptor connected to the piston, wherein the lift adaptor includes a substantially spherical engagement surface.

31. The device of claim 24, further comprising:
- a lift adaptor connected to the piston, wherein the lift adaptor includes a substantially cylindrical engagement surface.

32. The device of claim 24, wherein the weight gauge further comprises:
- a weight gauge configured and arranged to convert the internal fluid pressure of the jack when the jack has lifted a vehicle or trailer, into a weight measurement, representing the weight or force being loaded onto the jack by said vehicle or trailer.

* * * * *